United States Patent
Hsiao et al.

(10) Patent No.: US 9,115,271 B2
(45) Date of Patent: Aug. 25, 2015

(54) CARBON NANOTUBE POWDERS AND METHODS FOR MANUFACTURING THE SAME AND COMPOSITE MATERIALS

(75) Inventors: An-En Hsiao, Shetou Township (TW); Shinn-Jen Chang, Hsinchu (TW); Shu-Ya Tsai, Hsinchu (TW); Mei-Wen Hsu, Xinfeng Township (TW)

(73) Assignee: INDUSTRIAL TECHNOLOGY RESEARCH INSTITUTE (TW)

( * ) Notice: Subject to any disclaimer, the term of this patent is extended or adjusted under 35 U.S.C. 154(b) by 752 days.

(21) Appl. No.: 13/349,277

(22) Filed: Jan. 12, 2012

(65) Prior Publication Data
US 2013/0062574 A1    Mar. 14, 2013

(30) Foreign Application Priority Data
Sep. 14, 2011 (TW) .............................. 100132976 A

(51) Int. Cl.
| | |
|---|---|
| *H01B 1/04* | (2006.01) |
| *C01B 31/02* | (2006.01) |
| *C08L 23/02* | (2006.01) |
| *C08J 3/205* | (2006.01) |
| *C08J 5/00* | (2006.01) |

(Continued)

(52) U.S. Cl.
CPC ............... *C08L 23/02* (2013.01); *B82Y 30/00* (2013.01); *C08F 293/00* (2013.01); *C08J 3/205* (2013.01); *C08J 5/005* (2013.01); *C08K 7/24* (2013.01); *C08J 2333/06* (2013.01)

(58) Field of Classification Search
CPC ........... H01B 1/04; B82Y 30/00; B82Y 40/00
USPC ................... 252/500–511; 423/445 B, 447.2; 977/742, 773, 779, 788, 842
See application file for complete search history.

(56) References Cited

U.S. PATENT DOCUMENTS

| | | | |
|---|---|---|---|
| 7,829,055 B2 | 11/2010 | Lee et al. | |
| 2008/0255294 A1* | 10/2008 | Yerushalmi-Rozen | ....... 524/495 |

(Continued)

FOREIGN PATENT DOCUMENTS

| | | |
|---|---|---|
| CN | 101193973 | 6/2008 |
| CN | 101862619 | 10/2010 |

(Continued)

OTHER PUBLICATIONS

Linton et al. ("The importance of chain connectivity in the formation of non-covalent interactions between polymers and single-walled carbon nanotubes and its impact on dispersion." Soft Matter, 6, pp. 2801-2814, web May 10, 2010).*

(Continued)

*Primary Examiner* — Tri V Nguyen
(74) *Attorney, Agent, or Firm* — Lowe Hauptman & Ham, LLP

(57) ABSTRACT

Disclosed is a carbon nanotube powder, including a carbon nanotube averagely mixed with a dispersant, wherein the carbon nanotube and the dispersant have a weight ratio of 30:70 to 90:10. The carbon nanotube has a diameter of 10 nm to 100 nm, and a length/diameter ratio of 100:1 to 5000:1. The dispersant is an alternative copolymer, a block copolymer, or a random copolymer polymerized of a solvation segment (A) and a carbon affinity group (B). The carbon nanotube powder can be blended with a thermoplastic material to form a composite, wherein the carbon nanotube and the composite have a weight ratio of 0.5:100 to 50:100.

9 Claims, 4 Drawing Sheets

(51) Int. Cl.
*C08K 7/24* (2006.01)
*C08F 293/00* (2006.01)
*B82Y 30/00* (2011.01)

(56) References Cited

U.S. PATENT DOCUMENTS

2008/0262160 A1* 10/2008 Du Prez et al. ............... 525/228
2008/0293853 A1    11/2008 Wolf et al.
2009/0306276 A1* 12/2009 Magnet et al. ............... 524/556
2010/0059720 A1*  3/2010 Berkei et al. ................ 252/511

FOREIGN PATENT DOCUMENTS

| JP | 2009190924 | | 8/2009 | |
|---|---|---|---|---|
| JP | 2010119949 | | 6/2010 | |
| JP | 2011074146 | A * | 4/2011 | ............... C08F 2/44 |
| TW | 200815283 | | 4/2008 | |
| WO | WO 2007/011684 | | 1/2007 | |
| WO | WO 2007/096479 | | 8/2007 | |
| WO | WO 2008/112362 | | 9/2008 | |

OTHER PUBLICATIONS

Lahelin et al. ("In situ polymerization of methyl methacrylate/multi-walled carbon nanotube composites using cationic stearyl methacrylate copolymers as dispersants." Eur Polym J, 47, pp. 873-881, online Mar. 3, 2011).*

Notice of Allowance dated Nov. 19, 2013 from corresponding application No. JP 2012-201370.

Office Action dated Sep. 17, 2013 from corresponding application No. TW 100132976.

* cited by examiner

CARBON NANOTUBE POWDERS AND METHODS FOR MANUFACTURING THE SAME AND COMPOSITE MATERIALS

CROSS REFERENCE TO RELATED APPLICATIONS

This Application claims priority of Taiwan Patent Application No. 100132976, filed on Sep. 14, 2011, the entirety of which is incorporated by reference herein.

BACKGROUND OF THE INVENTION

1. Field of the Invention

The disclosure relates to a composite, and in particular relates to a method of dispersing a carbon nanotube in the composite.

2. Description of the Related Art

Plastic products, having flexibility and light weight, are widely applied in the household industry. Because the thermoplastic material is inherently insulative, the electrostatic charges may accumulate on the thermoplastic material by rubbing of the thermoplastic material's surface. The electrostatic charges will disturb processes, e.g. degrade a roll-to-roll property of thermoplastic material films or adhere to the thermoplastic material films, attracting dust or dirt to reduce yield of production lines, interfere with or damage electronic equipments, or cause sparks and bursting.

3C electronic products are being developed to have a light weight, and be thin, short, and small, such that development is towards high densities and high frequencies. The electrostatic disturbance and electromagnetic compatibility (EMC) problem of small and high dense devices need to be overcome. A metal shell may shield the electromagnetic wave and achieve anti-electrostatic effect; however, metal is difficult to process due to its high density. The metal shell is therefore replaced by a coating of a conductive paint, sputtering of a metal layer, or electroless plating of a metal layer on the shell; however, these methods of substitution still have problems such as high costs, complicated processes, and environmental pollution. In addition, the metal layer on the shell easily peels to lose its effect.

For application in electronic products, the electrostatic problem of the thermoplastic material can be solved by blending an anti-electrostatic/conductive material into the thermoplastic material. The blend is then extrusion or injection molded to form a composite having anti-electrostatic ($10^9$ to $10^{12}$ ohm/□), electrostatic discharge ($10^6$-$10^9$ ohm/□), conductivity ($\leq 10^6$ ohm/□), and electromagnetic interference ($\leq 10^4$ ohm/□) functions.

For averagely dispersing the anti-electrostatic material into the thermoplastic material, an additive and a carrier are mixed, melted, and pelletized to form a master batch. The master batch and the thermoplastic material are then mixed and melted, such that the additive and the thermoplastic material have good compatibility due to wettability and dispersity of the carrier. The current mainstream anti-electrostatic material is ester, amine, and organic salt, which may adsorb moisture in air to form a conductive aqueous layer on its surface. As such, a product must be put in a circumstance with moisture for several days for anti-electrostatic effect, which may easily fail due to insufficient moisture. The anti-electrostatic material easily migrates to the surface of the product by heating the product. In addition, the anti-electrostatic effect of the product is easily reduced or disappears by stretching the product.

If carbon black is adopted as an anti-electrostatic/conductive material averagely dispersed in the thermoplastic material, the carbon will contact or separate by a short distance (usually less than 2 nm) to form a conductive path. However, the carbon black amount needs to meet the requirement of a high percolation threshold. For example, the carbon black serving as the anti-electrostatic material should be greater than 5 wt % of the composite, and the carbon black serving as the conductive material should be greater than 20 wt % of the composite, respectively. A high amount of the carbon black will influence the processability and mechanical properties of the composite, and depart carbon to pollute the product and influence the thermoplastic material appearance after rubbing of the composite surface. The electric properties of the composite added with the carbon black is still influenced by stretching. There is no conventional composite, wherein its anti-electrostatic property is held constant, even after being stretched for four or more times in size.

A carbon nanotube (CNT) having excellent electric and mechanical properties is suitable to serve as a conductive filler or a strengthening material. However, the carbon nanotube surface is smooth and chemical inert, such that the carbon nanotube and the thermoplastic material have poor compatibility. In addition, the carbon nanotubes have high length/diameter ratio, such that the carbon nanotubes easily attract or tangle to each other due to strong Van der Walls force therebetween. As such, the carbon nanotube cannot be dispersed in the thermoplastic material. Furthermore, the carbon nanotube is inherently light weight, occupies a lot of space, and is easily blown, thereby increasing the trouble in handling and storing the carbon nanotube. Accordingly, the carbon nanotube is difficult to be directly processed and applied.

For averagely dispersing the carbon nanotube in the thermoplastic material, the carbon nanotube can be modified as below. In the first method, the carbon nanotube surface can be chemical modified by a strong acid such as hydrochloric acid or nitric acid, thereby forming carbonic acid and the likes on the carbon nanotube surface. Thereafter, the carbonic acid and the likes can be further grafted or modified. On the other hand, the carbon nanotube surface can be directly modified or grafted by a radical reaction, thereby improving the activity of the inert carbon nanotube surface. Thereafter, the chemical modified carbon nanotube is blended with the thermoplastic material. The chemical modification often damage the carbon nanotube wall, thereby reducing the conductivity of the carbon nanotube. In the second method, or so-called in-situ polymerization method, the monomer and the carbon nanotube are averagely mixed in a solution. The monomer is then polymerized, thereby dispersing the carbon nanotube in the polymer polymerized from the monomer. In the third method, or so-called solution process the, the carbon nanotube and the polymer solution are averagely mixed. A solid is then obtained by re-precipitation or removing the solvent of the mixture. This method can averagely disperse the carbon nanotube in the thermoplastic material, however, it is not suitable for mass production due to its complicated processes, high cost and toxicity of the solvent, and solubility limitations of the polymer in the solvent.

Accordingly, a method of efficiently dispersing the carbon nanotube in the thermoplastic material without damaging the carbon nanotube surface is still called-for.

BRIEF SUMMARY OF THE INVENTION

One embodiment of the disclosure provides a carbon nanotube powder, comprising: a carbon nanotube averagely mixed with a dispersant, wherein the carbon nanotube and the dispersant have a weight ratio of 30:70 to 90:10, the carbon nanotube has a diameter of 10 nm to 100 nm, and a length/diameter ratio of 100:1 to 5000:1, the dispersant is an alternative copolymer, a block copolymer, or a random copolymer polymerized of a solvation segment (A) and a carbon affinity group (B), the solvation segment (A) has a formula as below:

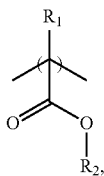

wherein $R_1$ is hydrogen or a methyl group, and $R_2$ is hydrogen, $C_{1-20}$ alkyl group, $C_{1-20}$ alkyl alcohol group, $C_{1-20}$ ether group, $C_{1-20}$ ether alcohol group, $C_{1-20}$ amino ester group, phenyl group, sulfonic acid group, $C_{1-20}$ amino group, carbonic acid group, or phosphoric acid group, and the carbon affinity group (B) has a formula as below:

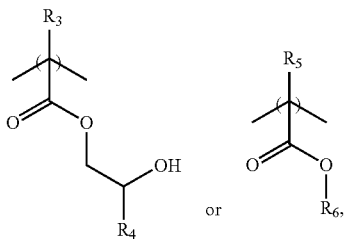

wherein $R_3$ is hydrogen or a methyl group, $R_4$ is a $C_{1-20}$ alkyl alcohol amino group, $C_{1-20}$ amino group, $C_{1-20}$ alkyl amino group, $C_{1-20}$ ether amino group, or $C_{1-20}$ amino ester group, $R_5$ is hydrogen or a methyl group, and $R_6$ is a $C_{1-10}$ alkyl alcohol amino group, $C_{1-10}$ amino group, $C_{1-20}$ ether amino group, or $C_{1-10}$ amino ester group.

One embodiment of the disclosure provides a method of forming a carbon nanotube powder, comprising: adding a carbon nanotube and a dispersant to an organic solvent, wherein the carbon nanotube and the dispersant have a weight ratio of 30:70 to 90:10; supersonic oscillating and stirring the organic solvent to disperse the carbon nanotube in the organic solvent; and filtering, baking, and collecting a solid in the organic solvent to obtain a carbon nanotube powder, wherein the carbon nanotube is averagely mixed with the dispersant.

One embodiment of the disclosure provides a method of forming a composite, comprising: forming the described carbon nanotube powder; and blending the carbon nanotube powder and a thermoplastic material to form a composite, wherein the carbon nanotube and the composite have a weight ratio of 0.5:100 to 50:100.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION OF THE INVENTION

Figure 1:
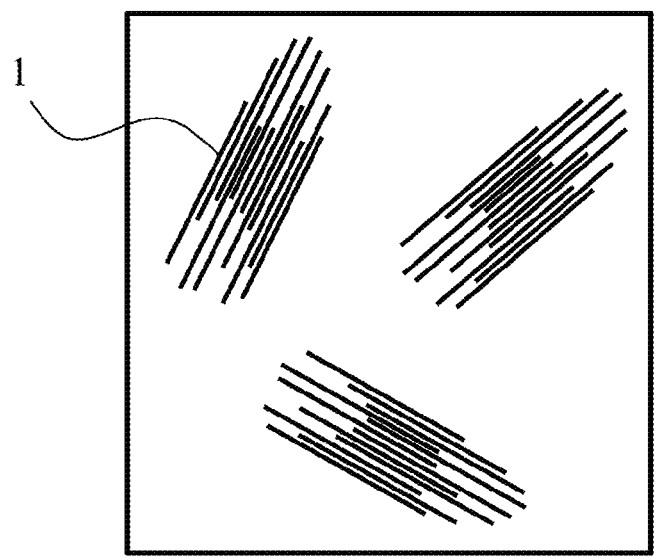
FIG. 1 shows a carbon nanotube not modified by a dispersant in one embodiment of the disclosure.

The following description is of the best-contemplated mode of carrying out the disclosure. This description is made for the purpose of illustrating the general principles of the disclosure and should not be taken in a limiting sense. The scope of the disclosure is best determined by reference to the appended claims.

A carbon nanotube having a high length/diameter ratio is adopted as a conductive material blended in a thermoplastic material. The general anti-electrostatic materials are difficult to be processed and applied due to problems as below: (1) the anti-electrostatic material must be put in a circumstance with moisture for several days for anti-electrostatic effect; (2) the anti-electrostatic effect of the composite easily reduces or disappears by stretching the composite; and (3) the carbon nanotube is inherently light weight, easily blown, easily aggregated and difficult to disperse. To overcoming the described problems, one embodiment of the disclosure firstly modifies the surface of the carbon nanotube by a dispersant to obtain a carbon nanotube powder having excellent dispersity. The dispersant may form connections between the carbon nanotube, thereby reducing the light weight and blowing properties of the carbon nanotube, and therefore improving the flowability and dispersity of blending the carbon nanotube and the thermoplastic material. The carbon nanotube having dispersity can be blended with the thermoplastic material to form a carbon nanotube conductive master batch. The master batch can be further mixed with more thermoplastic material to be applied as film or plate.

In Polymer, 2002, 43, page 211, carbon nanotubes of different length/diameter ratios are blended in polycarbonate. With a carbon nanotube having low length/diameter ratio (e.g. L/D=10 to 100) being adopted, the amount of the carbon nanotube in the composite should be higher than 8 wt % to meet the requirement of a percolation threshold. With a carbon nanotube having a high length/diameter ratio (e.g. L/D=100 to 1000) being adopted, the amount of the carbon nanotube in the composite only needs to be higher than 1 wt % to meet the requirement of a percolation threshold. In other words, the carbon nanotube having a high length/diameter ratio easily forms the conductive net in the thermoplastic material. In Composites science and technology, 2008, 68, page 1422, the carbon nanotube having higher length/diameter ratio will have worse dispersity in the thermoplastic material. For easy forming of the conductive net and dispersal in the thermoplastic material, the carbon nanotube of the disclosure has a length/diameter of 100:1 to 5000:1. Forming a conductive net is difficult for a carbon nanotube having an overly low length/diameter ration. Being easy to aggregate and not easily dispersed is a characteristic of a carbon nanotube having an overly high length/diameter. The carbon nanotube in the disclosure has a suitable diameter of 10 nm to 100 nm, preferably 10 nm to 50 nm Forming a conductive net is difficult for a carbon nanotube having an overly long diameter. Being easy to aggregate and not easily dispersed is a characteristic of a carbon nanotube having an overly short diameter. The carbon nanotube can be a single wall carbon nanotube or a multi wall carbon nanotube. In one embodiment, the carbon nanotube is a multi wall carbon nanotube.

As shown in FIG. 1, the carbon nanotubes 1 having a high length/diameter ratio have strong Van der Waal force therebetween, thereby easily aggregating to each other and being difficult to disperse. In addition, storage, processing, and application of the carbon nanotubes are difficult due to its inherently light weight and easily blown.

Figure 2:
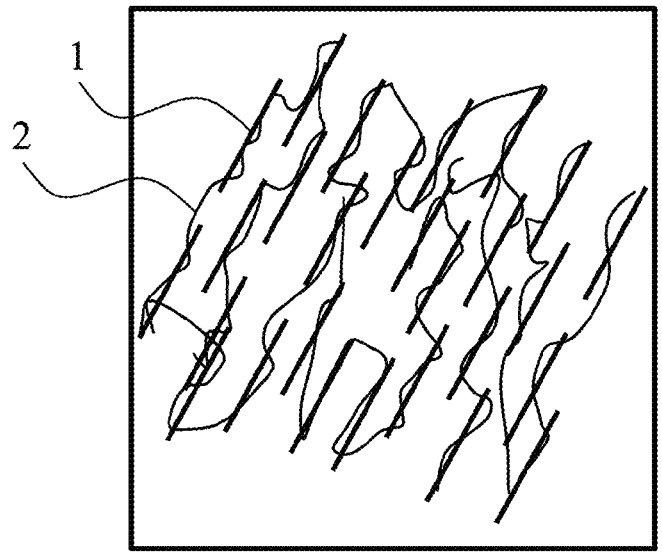
FIG. 2 shows a carbon nanotube modified by a dispersant in one embodiment of the disclosure.
Figure 3:
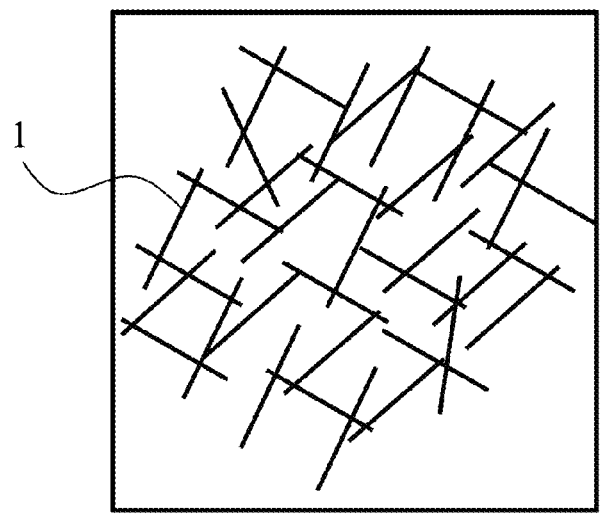
FIG. 3 shows a conductive net of the carbon nanotube modified by the dispersant in a thermoplastic material in one embodiment of the disclosure.

As shown in FIG. 2, the surface of the carbon nanotubes 1 is modified by a dispersant 2, thereby forming connections between the carbon nanotubes 1. As such, the problems such as light weight, blowing properties, and the aggregation phenomenon of the carbon nanotubes 1 are reduced. The dispersed carbon nanotube powder can be blended with a thermoplastic material to form a composite, thereby improving the flowability and dispersity of the carbon nanotubes in the thermoplastic material. Accordingly, the carbon nanotubes 1 easily form a net as shown in FIG. 3.

In one embodiment, the dispersant 2 is dispersant is an alternative copolymer, a block copolymer, or a random copolymer polymerized of a solvation segment (A) and a carbon affinity group (B). The dispersant 2 has a weight-average molecular weight of 5,000 to 100,000. A dispersant having an overly high weight-average molecular weight will have an overly high viscosity, which is not beneficial for dispersing the carbon nanotube in a solution or the thermoplastic material. A dispersant having an overly low weight-average molecular weight cannot provide enough dispersity for the carbon nanotube.

The solvation segment (A) may increase flowability and dispersity of the carbon nanotube in solvent and the thermoplastic material. The solvation segment (A) has a formula as shown in Formula 1.

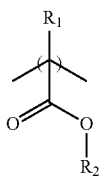

(Formula 1)

In Formula 1, $R_1$ is hydrogen or a methyl group, and $R_2$ is hydrogen, $C_{1-20}$ alkyl group, $C_{1-20}$ alkyl alcohol group, $C_{1-20}$ ether group, $C_{1-20}$ ether alcohol group, $C_{1-20}$ amino ester group, phenyl group, sulfonic acid group, $C_{1-20}$ amino group, carbonic acid group, or phosphoric acid group. In one embodiment, $R_1$ is hydrogen or a methyl group, and $R_2$ is hydrogen, $C_{1-6}$ alkyl group, $C_{1-6}$ alkyl alcohol group, $C_{1-6}$ ether group, $C_{1-6}$ ether alcohol group, $C_{1-6}$ amino ester group, phenyl group, sulfonic acid group, $C_{1-6}$ amino group, carbonic acid group, or phosphoric acid group.

The carbon affinity group (B) has adsorption force or π-π interaction with the surface of the carbon nanotube. The solvation segment (B) has a formula as shown in Formula 2 or Formula 3.

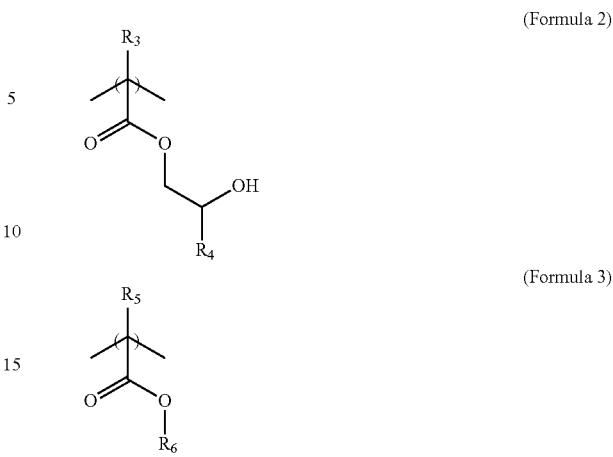

In Formula 2, $R_3$ is hydrogen or a methyl group, and $R_4$ is a $C_{1-20}$ alkyl alcohol amino group, $C_{1-20}$ amino group, $C_{1-20}$ alkyl amino group, $C_{1-20}$ ether amino group, or $C_{1-20}$ amino ester group. In one embodiment, $R_3$ is hydrogen or a methyl group, and $R_4$ is a $C_{1-6}$ alkyl alcohol amino group, $C_{1-6}$ amino group, $C_{1-10}$ alkyl amino group, $C_{1-6}$ ether amino group, or $C_{1-6}$ amino ester group. In Formula 3, $R_5$ is hydrogen or a methyl group, and $R_6$ is a $C_{1-10}$ alkyl alcohol amino group, $C_{1-10}$ amino group, $C_{1-20}$ ether amino group, or amino ester group. In one embodiment, $R_5$ is hydrogen or a methyl group, and $R_6$ is a $C_{1-6}$ alkyl alcohol amino group, $C_{1-6}$ amino group, $C_{1-6}$ ether amino group, or $C_{1-6}$ amino ester group.

The dispersant can be prepared by copolymerizing monomers corresponding to the solvation segment (A) and the carbon affinity group (B) by conventional methods. For example, a monomer corresponding to the solvation segment (A) and another monomer corresponding to the carbon affinity group (B) are simultaneously charged in a bottle for copolymerization for preparing a random copolymer. Alternatively, the monomer corresponding to the solvation segment (A) is polymerized to form an oligomer, and the monomer corresponding to the carbon affinity group (B) is polymerized to form another oligomer, wherein the oligomers are further copolymerized to prepare a block copolymer. In another embodiment, the monomer corresponding to the solvation segment (A) (or the carbon affinity group (B)) is firstly polymerized to form an oligomer, and the monomer corresponding to the carbon affinity group (B) (or the solvation segment (A)) is then added to be polymerized on the oligomer to prepare a block copolymer, or vise versa.

In one embodiment, the carbon nanotube surface is modified by the dispersant as below. The carbon nanotube and the dispersant are added to an organic solvent, wherein the carbon nanotube and the dispersant have a weight ratio of 30:70 to 90:10. An overly high ratio of the carbon nanotube (and an overly low ratio of the dispersant) cannot provide enough dispersity for the carbon nanotube. An overly low ratio of the carbon nanotube (and an overly high ratio of the dispersant) may leave too much dispersant in the thermoplastic material and influence product properties. The organic solvent used to disperse the carbon nanotube can be a solvent having high polarity such as DMSO, a solvent having low polarity such as n-hexane, or a solvent having a medium polarity such as THF or toluene. The organic solvent is then supersonic oscillated and stirred to disperse the carbon nanotube therein. If the dispersing condition is appropriate, the carbon nanotube will still be dispersed in the organic solvent after the supersonic oscillation and stirring are stopped. On the contrary, if the dispersing condition is inappropriate, e.g. solvent type, dispersant type, and/or dispersant/carbon nanotube ratio are inappropriate, the carbon nanotube will be precipitated in the vessel bottom after the supersonic oscillation and stirring are stopped. In one embodiment, the carbon nanotube and the organic solvent have a weight ratio of 0.01:100 to 20:100. An overly high ratio of the carbon nanotube (and an overly low ratio of the organic solvent) will easily cause the carbon nanotube to aggregate, thereby increasing a viscosity of the total solution and hindering carbon nanotube dispersion. Removing solvent will be troublesome for an overly low ratio of the carbon nanotube (and an overly high ratio of the organic solvent).

A solid in the organic solvent is then filtered, baked, and collected, thereby obtaining a carbon nanotube powder. The baked powder can be directly added to an organic solvent to form another dispersion without an additional dispersant. Accordingly, the carbon nanotube and the dispersant are averagely dispersed, whether in the organic solvent or after being filtered and baked.

Figure 4:
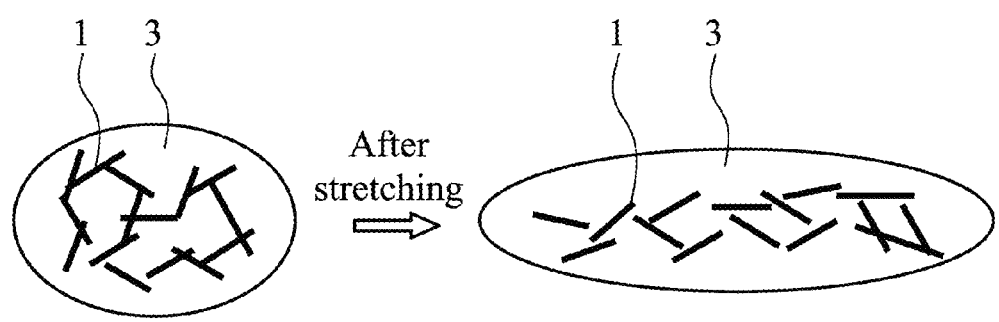
FIG. 4 shows the conductive net of the carbon nanotube modified by the dispersant after stretching a composite in one embodiment of the disclosure.

The carbon nanotube powder and a thermoplastic material can be blended with form a composite, and the carbon nanotube and the composite have a weight ratio of 0.5:100 to 50:100, preferably of 1:100 to 15:100. An overly high ratio of the carbon nanotube in the composite cannot efficiently enhance the conductivity of the composite due to a saturated conductive net, but can influence the composite properties. A conductive net can not be formed with an overly low ratio of the carbon nanotube in the composite. In one embodiment, the thermoplastic material can be polyethylene, polypropylene, polystyrene, polyvinylchloride, acrylonitrile-butadiene-styrene copolymer, or polycarbonate. As shown in FIG. 4, the carbon nanotubes 1 are averagely dispersed in the thermoplastic material 3 to form the composite. Even if the composite is stretched, the carbon nanotubes having a high length/diameter ratio still contact to each other to reduce the electric resistance of the composite, thereby reducing the changing of the electric properties of the stretched composite.

In another embodiment, a carbon-containing filler, an oxide filler, or combinations thereof can be blended with the composite. The carbon-containing filler comprises carbon black, carbon fiber, C60, or combinations thereof. The oxide filler comprises zinc oxide, aluminum oxide, indium tin oxide, titanium oxide, or combinations thereof.

The described composite has sheet resistance of $10^{-2}$ ohm/□ to $10^{12}$ ohm/□. Even if the composite is stretched to 2 times its size, its sheet resistance still meets the electrical requirements such as anti-electrostatic property ($10^9$-$10^{12}$ ohm/□), electrostatic discharge ($10^6$-$10^9$ ohm/□), conductivity ($\leq 10^6$ ohm/□), and electromagnetic interference ($\leq 10^4$ ohm/□). Accordingly, the composite of the disclosure can be applied in an anti-electrostatic product, an electrostatic discharge product, an electromagnetic and radiation shield, 3C electronic equipment, an information technology product, electronic packaging material, an electrode, a conductive gel of wire, or a conductive material.

EXAMPLES

Comparative Example 1-1

10 mg of a carbon having a high length/diameter ratio (SN5906837 commercially available from Nanomaterial Store) and 15 mL of a solvent were charged in a 20 mL sample bottle, and then supersonic oscillated for over one hour. The carbon nanotube was precipitated and not averagely dispersed in the solvent such as DMSO, THF, toluene, or n-hexane after the supersonic oscillation was stopped.

Comparative Example 1-2

10 mg of a carbon having a high length/diameter ratio (SN5906837 commercially available from Nanomaterial Store), 10 mg of a dispersant, and 15 mL of a solvent were charged in a 20 mL sample bottle, and then supersonic oscillated for over one hour. The dispersant was a homopolymer polymerized of a solvation segment (A) as shown in Formula 1, wherein $R_1$ was a methyl group and $R_2$ was a butyl group. Each gram of the dispersant had an amine value (mg KOH) of 0. The carbon nanotube was precipitated and not averagely dispersed in the solvent such as DMSO, THF, toluene, or n-hexane after the supersonic oscillation was stopped.

Example 1-1

10 mg of a carbon having a high length/diameter ratio (SN5906837 commercially available from Nanomaterial Store), 10 mg of a dispersant, and 15 mL of a solvent were charged in a 20 mL sample bottle, and then supersonic oscillated for over one hour. The dispersant was a random copolymer polymerized of a solvation segment (A) as shown in Formula 1 and a carbon affinity segment (B) as shown in Formula 2, wherein $R_1$ was a methyl group, $R_2$ was a butyl group, $R_3$ was a methyl group, and $R_4$ was ethanol amine group. Each gram of the dispersant had an amine value (mg KOH) of 65. The carbon nanotube was averagely dispersed in the solvent such as DMSO, THF, toluene, or n-hexane after the supersonic oscillation was stopped.

Example 1-2

10 mg of a carbon having a high length/diameter ratio (SN5906837 commercially available from Nanomaterial Store), 10 mg of a dispersant, and 15 mL of a solvent were charged in a 20 mL sample bottle, and then supersonic oscillated for over one hour. The dispersant was a random copolymer polymerized of a solvation segment (A) as shown in Formula 1 and a carbon affinity segment (B) as shown in Formula 2, wherein $R_1$ was a methyl group, $R_2$ was a butyl group, $R_3$ was a methyl group, and $R_4$ was N-isopropylpiperazine group. Each gram of the dispersant had an amine value (mg KOH) of 76. The carbon nanotube was averagely dispersed in the solvent such as DMSO after the supersonic oscillation was stopped.

Example 1-3

10 mg of a carbon having a high length/diameter ratio (SN5906837 commercially available from Nanomaterial Store), 10 mg of a dispersant, and 15 mL of a solvent were charged in a 20 mL sample bottle, and then supersonic oscillated for over one hour. The dispersant was a random copolymer polymerized of a solvation segment (A) as shown in Formula 1 and a carbon affinity segment (B) as shown in Formula 2, wherein $R_1$ was a methyl group, $R_2$ was a butyl group, $R_3$ was a methyl group, and $R_4$ was 4-morpholinyl-2-ethylpiperazine group. Each gram of the dispersant had an amine value (mg KOH) of 36. The carbon nanotube was averagely dispersed in the solvent such as THF after the supersonic oscillation was stopped.

Example 1-4

10 mg of a carbon having a high length/diameter ratio (SN5906837 commercially available from Nanomaterial Store), 10 mg of a dispersant, and 15 mL of a solvent were charged in a 20 mL sample bottle, and then supersonic oscillated for over one hour. The dispersant was a block copolymer polymerized of a solvation segment (A) as shown in Formula 1 and a carbon affinity segment (B) as shown in Formula 2, wherein $R_1$ was a methyl group, $R_2$ was a butyl group, $R_3$ was a methyl group, and $R_4$ was amino ester acrylate group. Each gram of the dispersant had an amine value (mg KOH) of 48. The carbon nanotube was averagely dispersed in the solvent such as DMSO, THF, or toluene after the supersonic oscillation was stopped.

Example 1-5

10 mg of a carbon having a high length/diameter ratio (SN5906837 commercially available from Nanomaterial Store), 10 mg of a dispersant, and 15 mL of a solvent were charged in a 20 mL sample bottle, and then supersonic oscillated for over one hour. The dispersant was a block copolymer polymerized of a solvation segment (A) as shown in Formula 1 and a carbon affinity segment (B) as shown in Formula 3, wherein $R_1$ was a methyl group, $R_2$ was a butyl group, $R_5$ was a methyl group, and $R_6$ was amino ester acrylate group. Each gram of the dispersant had an amine value (mg KOH) of 14. The carbon nanotube was averagely dispersed in the solvent such as DMSO, THF, toluene, or n-hexane after the supersonic oscillation was stopped.

Example 1-6

10 mg of a carbon having a high length/diameter ratio (SN5906837 commercially available from Nanomaterial Store), 10 mg of a dispersant, and 15 mL of a solvent were charged in a 20 mL sample bottle, and then supersonic oscillated for over one hour. The dispersant was a block copolymer polymerized of a solvation segment (A) as shown in Formula 1 and a carbon affinity segment (B) as shown in Formula 2, wherein $R_1$ was a methyl group, $R_2$ was a butyl group, $R_3$ was a methyl group, and $R_4$ was N-isopropylpiperazine group. Each gram of the dispersant had an amine value (mg KOH) of 44. The carbon nanotube was averagely dispersed in the solvent such as DMSO, THF, toluene, or n-hexane after the supersonic oscillation was stopped.

Example 2

The dispersant, carbon nanotube, and solvent in Example 1-5 were charged in a beaker, and supersonic oscillated and stirred to form a carbon nanotube suspension. The suspension was filtered to collect a solid thereof. The solid was then baked by an oven to obtain a carbon nanotube powder. The dispersant amount, the carbon nanotube amount, the solvent type, and the carbon nanotube/dispersant weight ratio of the products are tabulated in Table 1.

As shown in Table 1, the content ratio of the carbon nanotube in the carbon nanotube powder can be tuned by changing the initial amounts of the carbon nanotube and the dispersant.

TABLE 1

| Carbon nanotube (g) | dispersant (g) | solvent | Carbon nanotube content in carbon nanotube solution (wt %) | Dispersant content in baked carbon nanotube powder (wt %) | Carbon nanotube content in baked carbon nanotube powder (wt %) |
|---|---|---|---|---|---|
| 0.3 | 0.075 | THF | 0.6 | 8 | 92 |
| 0.3 | 0.15 | Toluene | 0.6 | 14 | 86 |
| 0.3 | 0.3 | THF | 0.6 | 16 | 84 |
| 0.56 | 0.34 g | toluene | 2.6 | 23 | 77 |

For example, 0.34 g of the dispersant, 0.56 g of the carbon nanotube, and the toluene were mixed, supersonic oscillated, and stirred to from a carbon nanotube suspension, wherein the carbon nanotube concentration thereof was about 2.6 wt %. The carbon nanotube suspension was filtered to collect a solid thereof. The solid was then baked by an oven to obtain a carbon nanotube powder, wherein the carbon nanotube content ratio thereof was about 23%. The carbon nanotube modified by the dispersant was 5.7 times (4.4 times while taking off the dispersant weight) the weight of the carbon nanotube not modified by any dispersant for a same volume. Moreover, the carbon nanotube modified by the dispersant did not have properties such as light weight and being easy to blow. The dried carbon nanotube powder was further added to toluene without an additional dispersant, and the carbon nanotube was re-dispersed in the toluene. Accordingly, the prepared carbon nanotube powder had dispersity. When the toluene was replaced with a polar solvent such as diethylene glycol diethyl ether, dispersion was still obtained. The dispersion was filtered to collect a solid thereof. The solid was baked to obtain a carbon nanotube powder having dispersity.

Example 3

Preparation of Composite Materials

Figure 5:
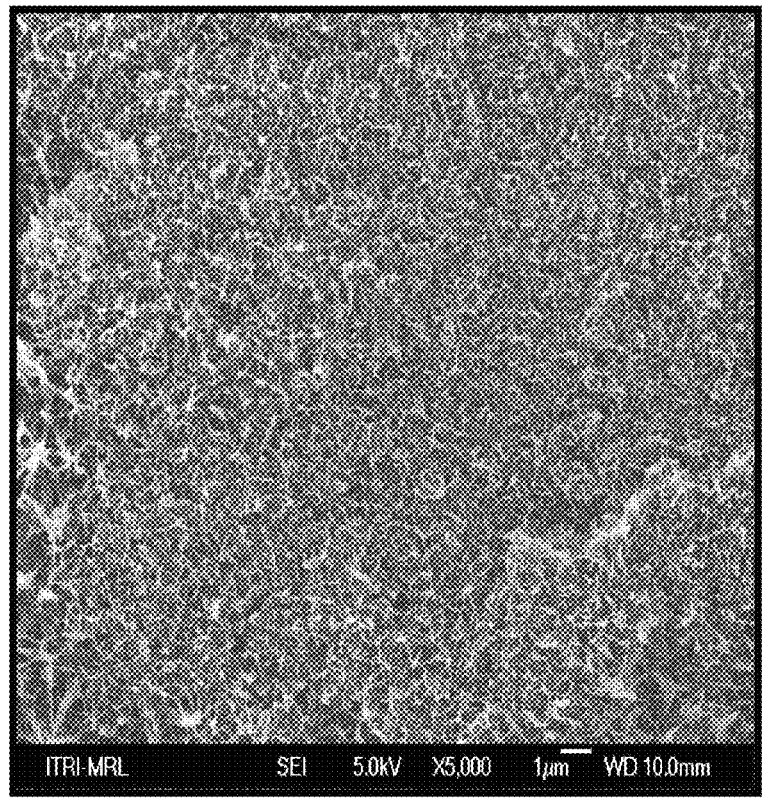
FIGS. 5-6 are SEM photographs of the composites in embodiments of the disclosure.

The carbon nanotube powder (modified by the dispersant) and polyethylene were kneaded, and then blended by a twin-screw extruder to form a carbon nanotube master batch. The carbon nanotube master batch and polyethylene were melted and blended to form composites of a carbon nanotube/polyethylene having different carbon nanotube content ratios (1 wt % to 10 wt %). The composites were pressed by a tablet press machine to form films. The sheet resistance of the films was measured and tabulated as shown in Table 2. FIG. 5 shows a SEM photograph of the master batch having 10 wt % of a carbon nanotube, wherein the carbon nanotube was averagely dispersed in the polyethylene. The composite having 2 wt % of a carbon nanotube was heated to melt, and then stretched to four times its size. The stretched film had a sheet resistance of $1 \times 10^{11}$ ohm/□ to meet anti-electrostatic requirements.

TABLE 2

| | 1 wt % | 2 wt % | 4 wt % | 6 wt % | 8 wt % | 10 wt % | 15 wt % |
|---|---|---|---|---|---|---|---|
| Sheet resistance (ohm/□) | >$10^{13}$ | $3 \times 10^{10}$ | $4 \times 10^{7}$ | $1.6 \times 10^{5}$ | $2 \times 10^{1}$ | $1 \times 10^{1}$ | $5 \times 10^{-1}$ |

Figure 6:
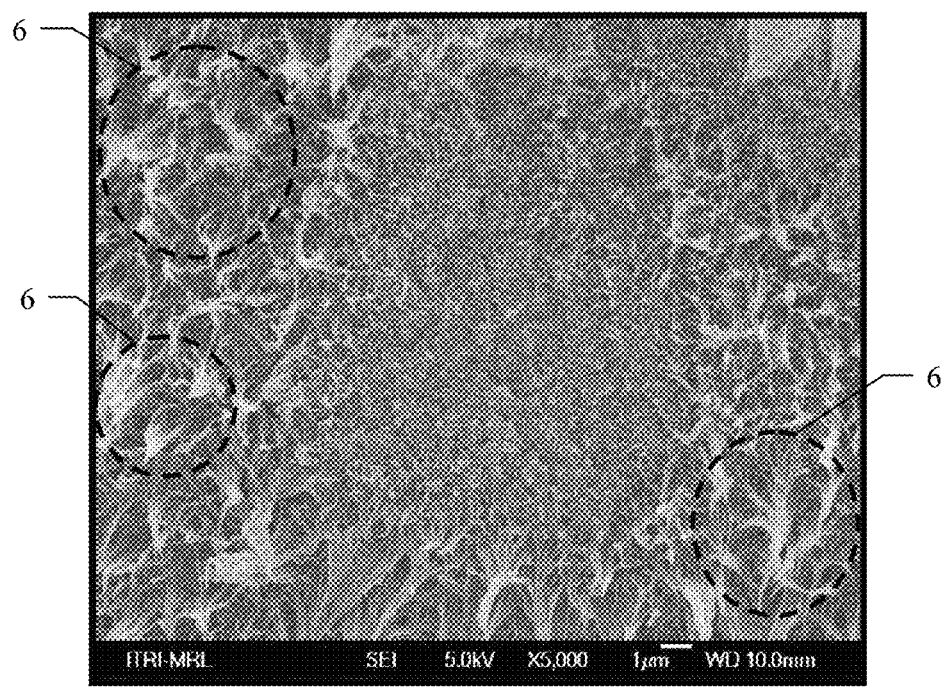

Meanwhile, the carbon nanotube not modified by any dispersant was directly blended with PE to form composites of a carbon nanotube/polyethylene having different carbon nanotube content ratios (1 wt % to 10 wt %). The composites were pressed by a tablet press machine to form films. FIG. 6 shows a SEM photograph of the composite, wherein the carbon nanotube not modified by any dispersant was poorly dispersed in the polyethylene, and the carbon nanotube obviously aggregated as shown by the dotted part 6. The sheet resistance of the films was high, as shown in Table 3. The composite having 2 wt % of a carbon nanotube was heated to melt, and then stretched to four times its size. The stretched film had a too high sheet resistance to meet anti-electrostatic requirements.

TABLE 3

| | 1 wt % | 2 wt % | 4 wt % | 6 wt % | 8 wt % | 10 wt % |
|---|---|---|---|---|---|---|
| Sheet resistance (ohm/□) | >$10^{13}$ | $1 \times 10^{11}$ | $2 \times 10^{10}$ | $4 \times 10^{6}$ | $4 \times 10^{5}$ | $6 \times 10^{4}$ |

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A carbon nanotube powder, comprising:
   a carbon nanotube averagely mixed with a dispersant, wherein the carbon nanotube and the dispersant have a weight ratio of 30:70 to 90:10,
   wherein the carbon nanotube has a diameter of 10nm to 100nm, and a length/diameter ratio of 100:1 to 5000:1,
   wherein the dispersant is an alternative copolymer, a block copolymer, or a random copolymer polymerized of a solvation segment (A) and a carbon affinity group (B),
   wherein the solvation segment (A) has a formula as below:

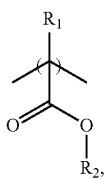

wherein $R_1$ is hydrogen or a methyl group, and
   $R_2$ is $C_{1-20}$ alkyl group, and
   wherein the carbon affinity group (B) has a formula as below:

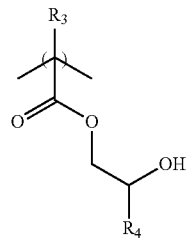

wherein $R_3$ is hydrogen or a methyl group, and
   $R_4$ is a $C_{1-20}$ amino group.

2. The carbon nanotube powder as claimed in claim 1, wherein the dispersant has a weight-average molecular weight of 5,000 to 100,000.

3. A method of forming a carbon nanotube powder, comprising:
   adding a carbon nanotube and a dispersant to an organic solvent, wherein the carbon nanotube and the dispersant have a weight ratio of 30:70 to 90:10;
   supersonic oscillating and stifling the organic solvent to disperse the carbon nanotube in the organic solvent; and
   filtering, baking, and collecting a solid in the organic solvent to obtain a carbon nanotube powder, wherein the carbon nanotube is averagely mixed with the dispersant, wherein the dispersant is an alternative copolymer, a block copolymer, or a random copolymer polymerized of a solvation segment (A) and a carbon affinity group (B),
   wherein the solvation segment (A) has a formula as below:

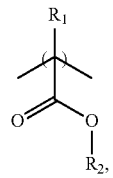

wherein $R_1$ is hydrogen or a methyl group, and
   $R_2$ is a $C_{1-20}$ alkyl group, and
   wherein the carbon affinity group (B) has a formula as below:

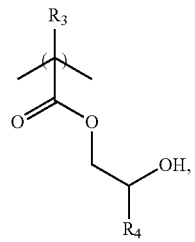

wherein $R_3$ is hydrogen or a methyl group,
   $R_4$ is a $C_{1-20}$ amino group.

4. The method as claimed in claim 3, wherein the carbon nanotube has a diameter of 10 nm to 100 nm, and a length/diameter ratio of 100:1 to 5000:1.

5. A method of forming a composite, comprising:
   forming the carbon nanotube powder as claimed in claim 3; and blending the carbon nanotube powder and a thermoplastic material to form a composite, wherein the carbon nanotube and the composite have a weight ratio of 0.5:100 to 50:100, wherein the composite comprises the dispersant.

6. The method as claimed in claim 5, wherein the step of blending the carbon nanotube powder and the thermoplastic material further comprises blending with a carbon-containing filler, an oxide filler, or combinations thereof.

7. The method as claimed in claim 6, wherein the carbon-containing filler comprises carbon black, carbon fiber, C60, or combinations thereof, and the oxide filler comprises zinc oxide, aluminum oxide, indium tin oxide, titanium oxide, or combinations thereof.

8. The method as claimed in claim 5, wherein the thermoplastic material comprises polyethylene, polypropylene, polystyrene, polyvinylchloride, acrylonitrile-butadiene-styrene copolymer, or polycarbonate.

9. The method as claimed in claim 5, wherein the composite is applied in an anti-electrostatic product, electrostatic discharge product, electromagnetic and radiation shield, 3C electronic equipment, information technology product, electronic packaging material, electrode, conductive gel of wire, or conductive material.

* * * * *